US010790743B2

(12) United States Patent
Götz

(10) Patent No.: US 10,790,743 B2
(45) Date of Patent: Sep. 29, 2020

(54) INDIVIDUAL MODULE, ELECTRICAL CONVERTER SYSTEM, AND BATTERY SYSTEM

(71) Applicant: Dr. Ing. h.c. F. Porsche Aktiengesellschaft, Stuttgart (DE)

(72) Inventor: Stefan Götz, Forstern (DE)

(73) Assignee: Dr. Ing. h.c. F. Porsche Aktiengesellschaft (DE)

(*) Notice: Subject to any disclaimer, the term of this patent is extended or adjusted under 35 U.S.C. 154(b) by 376 days.

(21) Appl. No.: 15/748,465

(22) PCT Filed: Apr. 4, 2016

(86) PCT No.: PCT/EP2016/025030
§ 371 (c)(1),
(2) Date: Jan. 29, 2018

(87) PCT Pub. No.: WO2017/016674
PCT Pub. Date: Feb. 2, 2017

(65) Prior Publication Data
US 2018/0219478 A1    Aug. 2, 2018

(30) Foreign Application Priority Data
Jul. 30, 2015    (DE) .................. 10 2015 112 512

(51) Int. Cl.
*H02M 3/155*    (2006.01)
*H02M 7/483*    (2007.01)
(Continued)

(52) U.S. Cl.
CPC ............ *H02M 3/155* (2013.01); *B60L 53/22* (2019.02); *H02J 7/00* (2013.01); *H02M 3/158* (2013.01);
(Continued)

(58) Field of Classification Search
CPC ...................................................... H02M 3/155
(Continued)

(56) References Cited

U.S. PATENT DOCUMENTS 7,755,918 B2    7/2010    Barbosa et al.
7,817,451 B2*   10/2010   Barbosa ............... H02M 7/483
                                                       363/131
(Continued)

FOREIGN PATENT DOCUMENTS

DE    102010052934 A1    5/2012
DE    102011108920 A1    1/2013
(Continued)

OTHER PUBLICATIONS

International Search Report and Written Opinion for International Application No. PCT/EP2016/025030, dated Jul. 14, 2016—8 Pages.
(Continued)

*Primary Examiner* — Jerry D Robbins
(74) *Attorney, Agent, or Firm* — RatnerPrestia

(57) ABSTRACT

A module for connecting to a second module of the same type to provide an electrical converter system or, a battery system, wherein the module comprises an energy storage, at least five internal switching elements, and at least two connections on each side of the module, wherein the energy storage is connected directly to at least one of the at least two connections and the internal switching elements are arranged and connected in such a way that the internal switching elements, independently of a switching state of corresponding internal switching elements of the second module of the same type, can realize all switching states in order to dynamically switch an electrical connection between the energy storage and a corresponding energy storage of the second module. The invention further relates to an electrical converter system and to a battery system.

16 Claims, 14 Drawing Sheets

(51) Int. Cl.
  *H02M 3/158* (2006.01)
  *B60L 53/22* (2019.01)
  *H02J 7/00* (2006.01)

(52) U.S. Cl.
  CPC ..... *H02M 7/483* (2013.01); *H02J 2007/0067* (2013.01); *H02J 2207/20* (2020.01)

(58) Field of Classification Search
  USPC .......................................................... 320/140
  See application file for complete search history.

(56) References Cited

U.S. PATENT DOCUMENTS

| | | | |
|---|---|---|---|
| 9,496,799 | B2 | 11/2016 | Goetz et al. |
| 9,502,960 | B2 | 11/2016 | Weyh et al. |
| 2009/0231896 | A1 | 9/2009 | Barbosa et al. |
| 2014/0049230 | A1* | 2/2014 | Weyh .................... H02M 7/483 323/207 |
| 2014/0226377 | A1* | 8/2014 | Goetz ................... H02M 3/158 363/65 |

FOREIGN PATENT DOCUMENTS

| | | |
|---|---|---|
| JP | 2010507358 A | 3/2010 |
| WO | 2008046772 A1 | 4/2008 |
| WO | 2012072168 A2 | 6/2012 |
| WO | 2012079822 A1 | 6/2012 |

OTHER PUBLICATIONS

Chinese Office Action for Chinese Application No. 2016800446700, dated May 15, 2019, 6 pages.

Notification of Reason for Rejection for Japanese Application No. 2018-504794, dated Mar. 12, 2019, 4 pages.

\* cited by examiner

INDIVIDUAL MODULE, ELECTRICAL CONVERTER SYSTEM, AND BATTERY SYSTEM

CROSS-REFERENCE TO RELATED APPLICATIONS

This U.S. national phase patent application Clans priority to PCT International Patent Application No. PCT/EP2016/025030, filed Apr. 4, 2016, which claims priority to German Patent Application No. DE 102015112512.9, filed Jul. 30, 2015, the content of each application being incorporated by reference herein in its entirety.

FIELD OF THE INVENTION

The invention relates to an individual module for providing an electrical converter system or a battery system, and also to a corresponding electrical converter system and to a corresponding battery system.

BACKGROUND OF THE INVENTION

Conventional batteries may be hardwired units comprising individual parts, such as e.g. individual cells or partial batteries. Such batteries substantially provide a DC voltage at an output. Many loads, however, require e.g. an AC voltage having a specific frequency, amplitude and/or phase. Furthermore, the DC voltage is not constant over the state of charge. In order to operate the loads connected to the battery both at a peak voltage and at an end-of-charge voltage and to be able to draw the demanded power, the loads have to have complex supply circuits.

If the voltage required by a load deviates greatly from the battery voltage, the circuit, as the result of a so-called low modulation index, causes high losses and high distortions in the output voltage provided for the load. In a motor vehicle having an electric drive, that concerns the drive, in particular, which at low speeds generally requires an AC voltage having a low amplitude. The distortions, which are generally brought about by pulse width modulation, there additionally load a provided insulation of a motor and thus have an adverse effect on the lifetime of the motor.

An additional factor is that, on account of the variation in the physical and chemical behavior of the battery cells, complex monitoring of the battery cells has to be provided in order to enable a uniform state of charge of the battery cells.

If e.g. an individual cell of the battery is defective, generally the entire battery becomes unusable. In the case of a vehicle, it is then necessary to reckon with the complete failure of the vehicle. A shutdown may even need to be actively forced in order that the defective battery parts do not overheat and possibly even catch fire upon further loading.

In order to provide an output voltage required by a load, an electrical power converter is used as a supply circuit. Various types of power converters serve to convert direct current into alternating current (inverter), alternating current into direct current (rectifier), or to adapt the frequency and amplitude of an AC voltage (converter). Accordingly, power converters may have different topologies.

Alternatively, instead of using a power converter, an AC voltage required by the bad could also be generated by dynamically switching an interconnection of a corresponding battery. In this case, switching elements are dynamically switched such that energy storage of the battery are present either in parallel connection and/or in series connection. Such a battery is referred to as a switched battery. In contrast to previous converters, here a modulation index to be provided, i.e. a characteristic value of a corresponding frequency modulation, can be kept at a maximum for all amplitudes. Furthermore, the losses even decrease at low voltages because an effective internal resistance decreases as a result of a parallel connection of battery parts of a switched battery. Furthermore, a switched battery in which the energy storage can be switched back and forth between a parallel connection and a series connection generates an almost distortion-free output voltage since steps between the voltages of two configurations can be kept very small. Moreover, modulation can be effected by switching modulation between such voltages in order to carry out further smoothing.

Electrical converters, a subtype of electrical power converters, convert DC voltage into AC voltage. Topologies for electrical converters are known e.g. from DE 10 2010 052 934 A1, which is incorporated by reference herein, and DE 10 2011 108 920 B4, which is incorporated by reference herein.

DE 10 2010 052 934 A1, which is incorporated by reference herein, describes an electrical converter system having at least two series-connected individual modules of the same type. The individual modules comprise at least four internal switching elements, at least one energy storage element and at least four terminals, two of which terminals respectively form a first and a second terminal pair. The internal switching elements of each individual module are embodied such that they can optionally connect one or both terminals of each terminal pair to the energy storage element. The switching elements of the respective individual modules in the series connection of the at least two individual modules connect their respective energy storage elements to the terminals of the series connection such that the energy storage elements are optionally connected in series or in parallel.

DE 10 2011 108 920 B4, which is incorporated by reference herein, continues this approach and likewise describes an electrical converter system comprising at least two series-connected modules of the same type, wherein the series-connected modules form a bridge branch. The modules comprise at least one module capacitor and switching elements. An intermediate module having at least one inductance for energy storage is connected at least between a module and a downstream module from the series-connected modules.

In the case of the converters described above, combinations of switching states of the internal switching elements of two modules enable different interconnections of the modules. To that end, it is necessary for the internal switching elements to be switched exactly jointly, i.e. simultaneously, in order to avoid a short circuit.

Other circuits are unable to integrate all the switching elements that have to be driven at an identical potential and/or simultaneously into a single module. In the case of these other circuits already known, by contrast, a plurality of modules have to be driven exactly simultaneously, i.e. in a time range of 100 nanoseconds, which is significantly shorter than the respective operating time variances occurring on account of temperature differences in many electronic circuits. This gives rise to a high outlay for a required synchronization.

SUMMARY OF THE INVENTION

It is an object of the invention to avoid the need for the exactly simultaneous switching of switching elements in individual modules to be interconnected.

The object is achieved according to aspects of the invention by means of an individual module, a converter system and a battery system as claimed in the independent claims. Configurations of the invention can be gathered from the respective dependent claims and the description.

Hereinafter and in the course of the present description, "battery part" is understood to mean an individual cell, but also an interconnection of a plurality of cells, e.g. a battery having a plurality of cells which is interconnected with a further battery having a plurality of cells.

Hereinafter and in the course of the present description, primary cells, secondary cells, capacitors of any type and energy sources and energy storage which use only DC voltage are deemed to be a "battery".

The individual module according to aspects of the invention serves, for interconnection with at least one second individual module of the same type. The interconnection of at least two individual modules of the same type is intended to provide an electrical converter system according to aspects of the invention, or respectively a battery system according to aspects of the invention.

The individual module according to aspects of the invention comprises at least one energy storage, at least five internal switching elements and at least two terminals respectively on a first and a second side of the individual module. The energy storage is directly connected to at least one of the at least two terminals of the first side. The internal switching elements are arranged and interconnectable such that, independently of a switching state of corresponding internal switching elements of the at least one second individual module of the same type, they can realize all switching states for dynamically switching an electrical connection between the at least one energy storage and a corresponding at least one energy storage of the at least one second individual module.

In the case of an interconnection of the individual module according to aspects of the invention with at least one second individual module of, the same type, a control of the respective individual modules is greatly simplified in comparison with an interconnection of modules known from the prior art. It is even possible here for the respective individual modules to be switched completely asynchronously or chaotically.

Most electrical switching elements, in particular transistors, have to be driven electrically relative to their own electrical potential, for example the so-called source potential. This has the effect that a plurality of driving arrangements, e.g. gate drivers of diverse transistors, have to be supplied via separate voltage supplies, e.g. insulated voltage supplies or bootstrap, supplies, For switching elements which, are situated on the same individual module, as in the case of the individual module according to aspects of the invention, the driving can be effected with a minimum of different potentials.

Switching elements which are situated on the same individual module can be driven with accurate timing, i.e. with a sufficient simultaneity. By contrast, if switching elements are activated or deactivated with a time delay, as is, necessarily the case e.g. in other solutions known from the prior art, high losses can arise on account of shunt currents or else on account of an intentional slowing down of the switching.

In one embodiment of the individual module according to aspects of the invention, the internal switching elements are low-voltage semiconductor switching elements. That is to say that the maximum voltage for which the switching elements are designed is significantly less than the total voltage of a system constructed from a plurality of individual modules, for example at the maximum voltage of the individual module with which the switching elements are associated, which is defined by the energy storage of the individual module.

This is possible since, according to aspects of the invention, all the switching elements which for dynamically switching an electrical connection between the at least one energy storage and a corresponding at least one energy storage of the at least one second individual module are situated on the same individual module. Therefore, the switching elements need only be designed for low voltage and inexpensive low-voltage components known from consumer electronics can be used. In contrast to low-voltage components, high-voltage semiconductor switching elements that are customary at the present time are produced only in very small numbers and, are more than proportionally expensive as a result. Modern MOSFET components (abbreviation of: metal-oxide-semiconductor field-effect transistor) are particularly ideal for use in an embodiment of the individual module according to aspects of the invention since their operating curve progresses linearly through a zero point of a current-voltage diagram and, therefore, they have no voltage offset, as a result of which MOSFETs can be connected in parallel very well.

Furthermore, an electrical converter system according to aspects of the invention using a least one individual module according to aspects of the invention and a battery system according to aspects of the invention using at least one individual module according to aspects of the invention are provided.

Further advantages and configurations of the invention are evident from the description and the accompanying drawings.

It goes without saying that the features mentioned above and those yet to be explained below can be used not only in the combination respectively indicated, but also in other combinations or by themselves, without departing from the scope of the present invention.

BRIEF DESCRIPTION OF THE DRAWINGS

The invention is illustrated schematically on the basis of embodiments in the drawings and is described schematically and thoroughly with reference to the drawings.

DETAILED DESCRIPTION OF THE INVENTION

Figure 1:
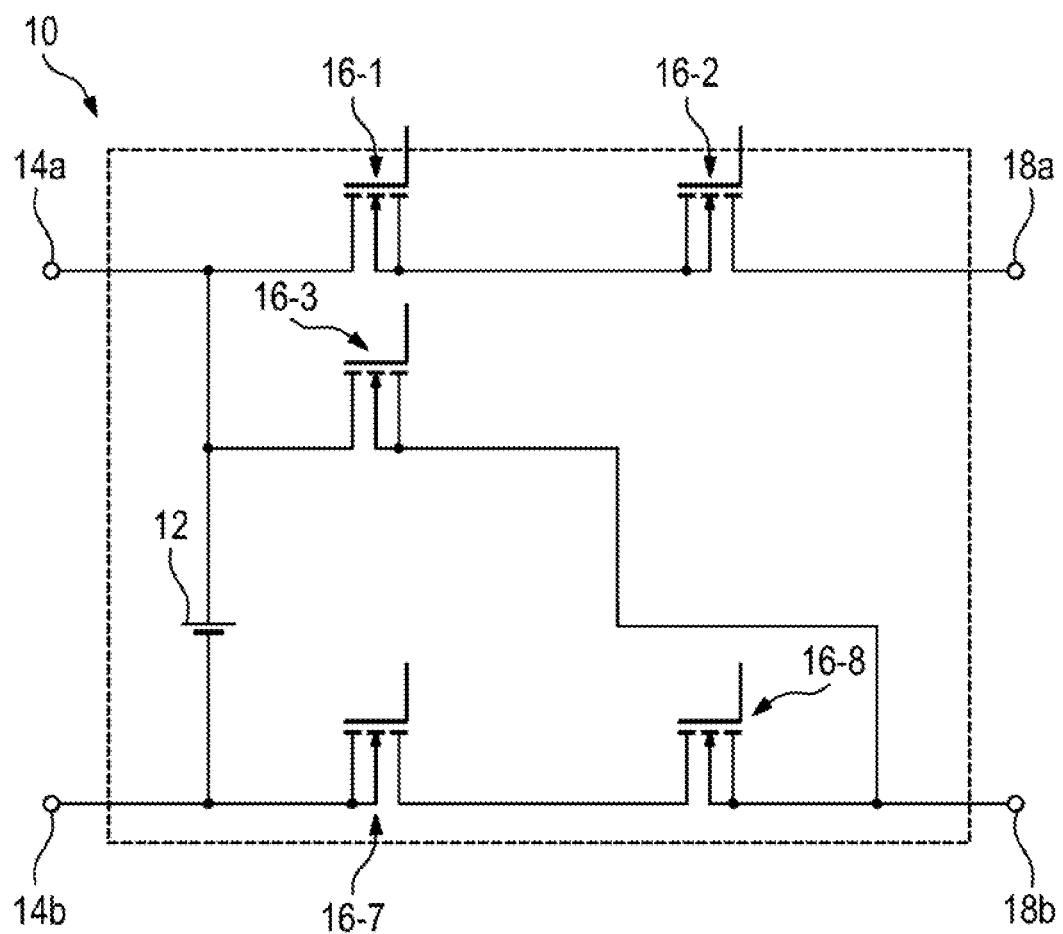
FIG. 1. shows one exemplary embodiment of an individual module according to aspects of the invention which represents a two-quadrant module.
Figure 4:
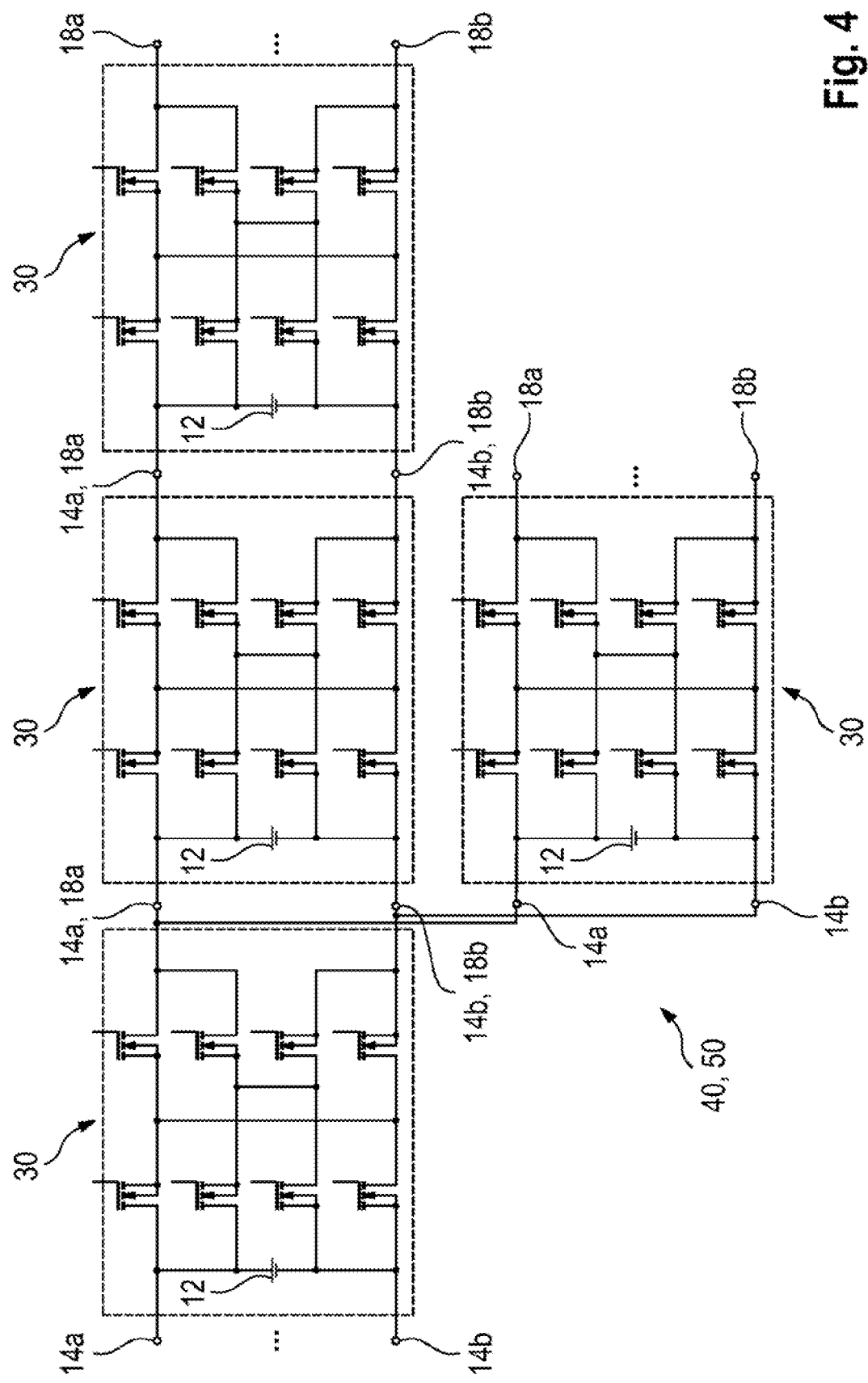
FIG. 4 shows one exemplary interconnection of a plurality of individual modules according to aspects of the invention.

Referring to FIG. 1, one embodiment of an individual module 10 according to aspects of the invention is described. The individual module 10 illustrated comprises two terminals 14a, 14b on a first side (on the left in FIG. 1). The individual module 10 comprises two further terminals 18a, 18b on a second side (on the right in FIG. 1), such that the individual module 10 comprises a total of four terminals 14a, 14b, 18a, 18b. The terminals 14a, 14b, 18a, 18b of a side are respectively configured to form a terminal pair, A terminal pair or the terminals 14a, 14b, 18a, 18b serve for electrically connecting the individual module 10 to to an adjacent individual module 10 or to nodes for connecting individual modules in parallel and forming side strings (FIG. 4).

An energy storage 12 is connected between the terminals 14a, 14b of the first side. The energy storage 12 is directly connected to at least one of the two terminals 14a, 14b. It is conceivable that an electrical fuse and/or a switching element or the like can be connected directly upstream and/or downstream of the energy storage 12.

Furthermore, the individual module 10 according to aspects of the invention comprises at least five switching elements 16-1, 16-2, 16-3, 16-7, 16-8. The switching elements 16-1, 16-2, 16-3, 16-7, 16-8 are arranged such that they connect the terminals 14a, 14b of the first side to the terminals 18a, 18b of the second side and are interconnectable such that they can interconnect the energy storage 12 of the individual module 10 according to aspects of the invention in parallel or in series with a corresponding energy storage of a neighboring individual module of the same type (not shown) or can bridge the energy storage 12. That is to say that all the switching elements 16-1, 16-2, 16-3, 16-7,, 16-8 that are required for the different switching states (parallel connection, series connection, bridging, deactivation) between two energy storage of adjacent individual modules are present on an individual module 10. As a result, the switching elements 16-1, 16-2, 16-3, 16-7, 16-8 can be driven with a minimum potential difference between the switching elements 16-1, 16-2, 16-3, 16-7, 16-8. That enables the switching elements 16-1, 16-2, 16-3, 16-7, 16-8 to be designed as low-voltage switching elements, such that e.g. inexpensive MOSFET semiconductor switching elements known from consumer electronics can be used for the switching elements 16-1, 16-2, 16-3, 16-7, 16-8. Furthermore, the switching elements 16-1, 16-2, 16-3, 16-7, 16-8 can be simultaneously activated in an accurate manner.

in FIG. 1, the terminal 14a of the first side can be connected to the terminal 18a of the second side via the switching elements 16-1 and 16-2. The terminal 14a can be connected to the terminal 18b of the second side via the switching element 16-3. The terminal 14b of the first side can be connected to the terminal 18b of the second side via the switching elements 16-7 and 16-8. It is thus possible to realize all the discussed switching states for dynamically switching the electrical connection between the energy storage 12 and a corresponding energy storage of an adjacent individual module.

In order to connect the energy storage 12 of the individual module 10 in parallel with a corresponding energy storage of a neighboring individual module of the same type, e.g. the switching elements 16-1, 16-2, 16-7, 16-8 have to be closed. Thus the terminal 14a is electrically connected to the terminal 18a and the terminal 14b is electrically connected to the terminal 18b, In this example, the switching element 16-3 is in an open switching state in this case.

In order to connect the energy storage 12 of the individual module 10 in series with a corresponding energy storage of a neighboring individual module of the same type, e.g. only the switching element 16-3 has to be closed. The switching elements 16-1, 16-2, 16-7, 16-8 have to be in an open switching state.

In order to switch a bridging of the energy storage 12 of the individual module 10, that is to say in order to produce a bypass interconnection, for example only the switching elements 16-1 and 16-2 have to be closed. In this case, the switching elements 16-3, 16-7, 16-8 have to be in an open switching state. A second possibility for producing a bypass interconnection is for only the switching elements 16-7 and 16-8 to be closed while the switching elements 16-1 to 16-3 are open.

Figure 2:
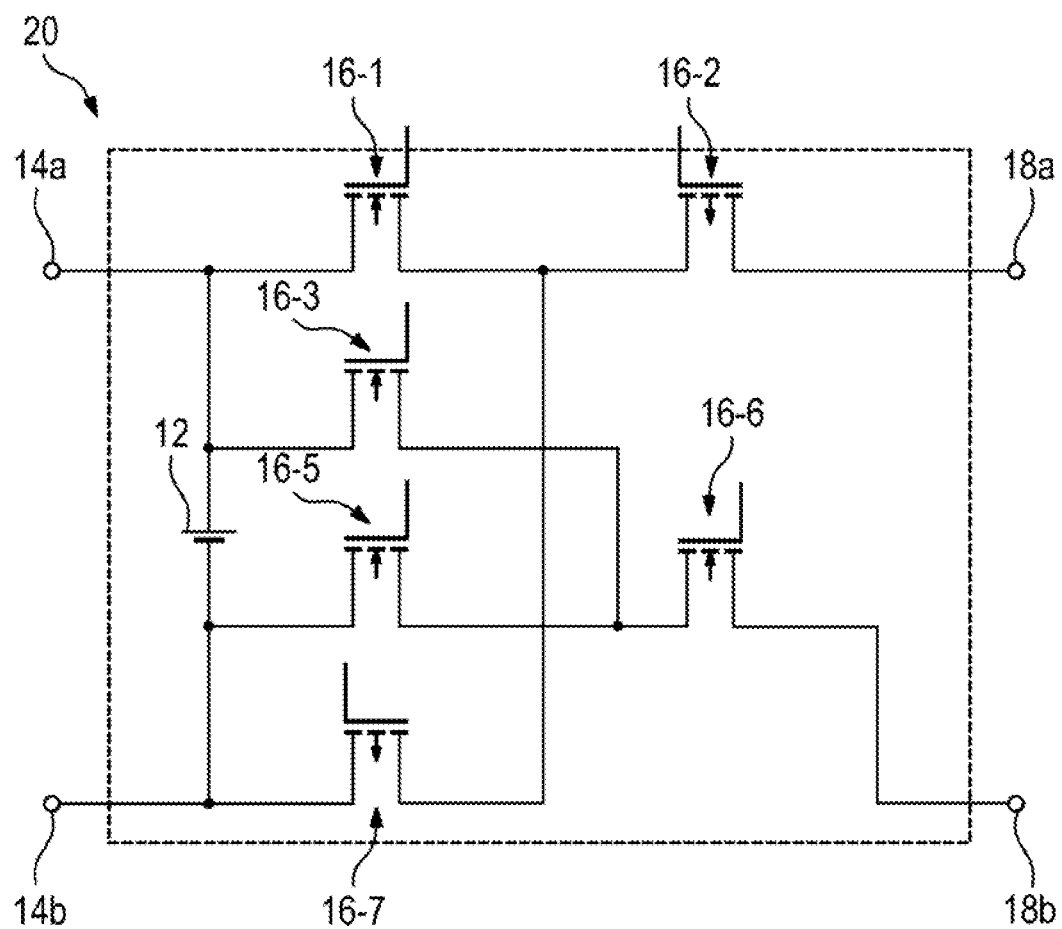
FIG. 2 shows a further exemplary embodiment of an individual module according to aspects of the invention which represents a four-quadrant module.

FIG. 2 illustrates a further embodiment of an individual module 20 according to aspects of the invention. The fundamental construction of the individual module 20 in FIG. 2 comprising one energy storage 12, four terminals 14a, 14b, 18a, Nth is identical to that of the individual module 10 in FIG. 1. However, the individual module 20 comprises six switching elements 16-1, 16-2, 16-3, 16-5, 16-6, 16-7. Furthermore, the terminals 14a, 14b can be connected to the terminals 18a, 18b and all required switching states (parallel, series, bypass interconnection, deactivation) can be established. By means of different arrangements of the switching elements 16-1, 16-2, 16-3, 16-5, 16-6, 16-7, specific switching states can be optimized regarding their losses vis-à-vis other switching states and thus enable an individual adaptation of the individual module 20 for corresponding applications.

In order to connect the energy storage 12 of the, individual module 20 in parallel with an adjacent individual module, for example the switching elements 16-1, 16-2 and 16-5, 16-6 are closed. The switching elements 16-3 and 16-7 are then in an open switching state.

in order to realize a series interconnection of the energy storage 12 with a corresponding energy storage, of an adjacent individual module, for example the switching elements 16-3 and 16-6 will be closed and the switching elements 16-1, 16-2, 16-5, 16-7 will be open. A further possibility for a series interconnection of the energy storage 12 with a corresponding energy storage of an adjacent individual module would be to put the switching elements 16-2 and 16-7 into a closed switching state and to put the switching elements 16-1, 16-3, 16-5, 16-6 into an open switching state. This affords two possibilities for a series interconnection of energy storage 12, which each have a different polarity, however, which constitutes a property of a four-quadrant module, as will be described in even greater detail below.

A bypass interconnection of the energy storage 12 of the individual module 20 can be achieved by closing the switching elements 16-1 and 16-2 when the switching elements 16-3 and 16-5 to 16-7 are open. A further bypass interconnection is achieved if only the switching elements 16-5, 16-6 are closed and the switching elements 16-1 to 16-3 and 16-7 are open.

Figure 3:
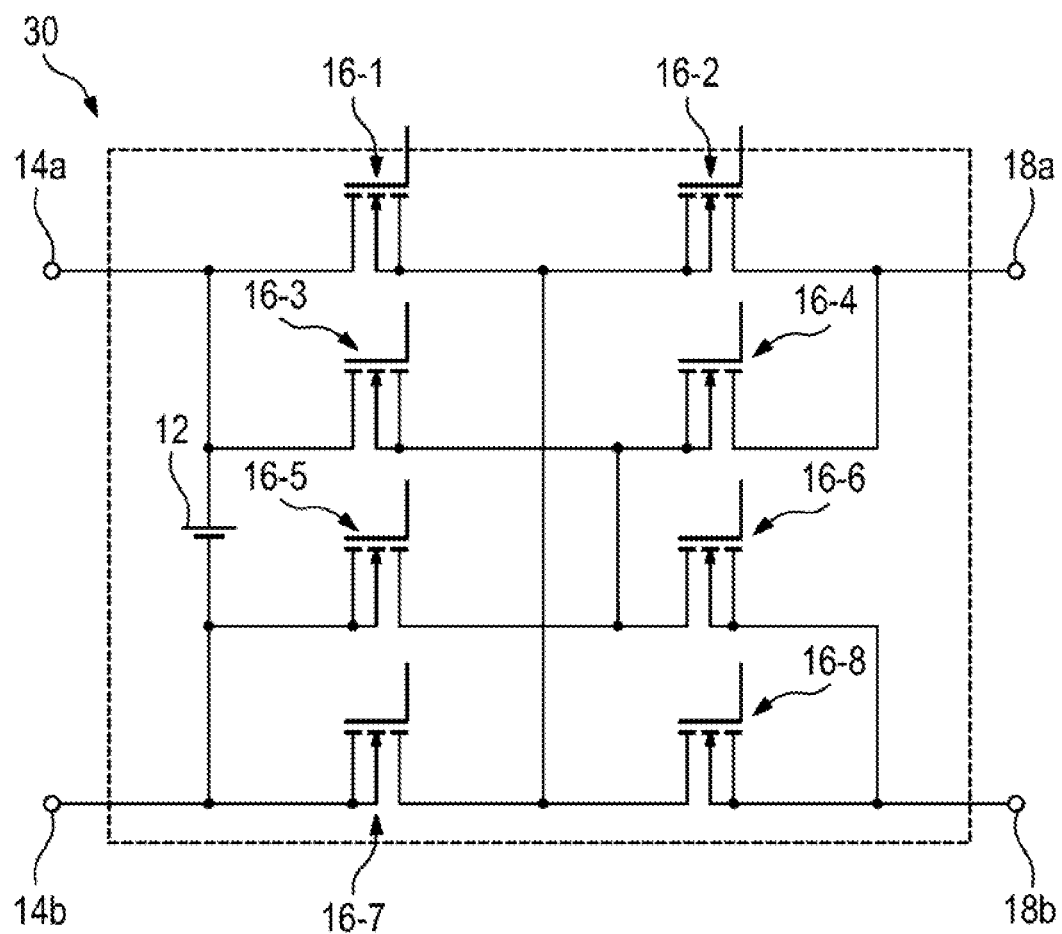
FIG. 3 shows one embodiment of an individual module according to aspects of the invention having redundant load paths.

FIG. 3 shows yet another embodiment of the individual module 30 according to aspects of the invention. The construction comprising four terminals 14a, 14b, 18a, 18b and one energy storage 12 substantially corresponds to the topologies already described in FIGS. 1 and 2. In the embodiment shown, the individual module 30 according to aspects of the invention now comprises eight switching elements 16-1, 16-2, 16-3, 16-4, 16-5, 16-6, 16-7, 16-8. Thus, for the electrical connection of the terminals 14*a*, 14*b* to the terminals 18*a*, 18*b*, in each case two load paths are available for each connection, that is to say 14*a*-18*a*, 14*a*-18*b*, 14*b*-18*a* and 14*b*-18*b*. That enables the switching elements 16-1, 16-2, 16-3, 16-4, 16-5, 16-6, 16-7, 16-8 to be designed for a lower current-carrying capacity.

The switching elements illustrated in FIG. 3 allow two parallel paths for almost all connections between the energy storage 12 and a corresponding energy storage of an adjacent individual module of the same type (as is illustrated e.g. in FIG. 4). The switching elements are correspondingly used in parallel. However, switching elements as shown in FIGS. 1 and 2 described above can be eliminated in order to reduce the complexity. The remaining switching elements should then be implemented with correspondingly larger semiconductors, however, in order to enable the same current-carrying capacity. By means of a corresponding choice of semiconductors, it is possible to optimize specific switching states regarding their losses vis-à-vis other switching states.

In this regard, the switching elements 16-1 and 16-2 form a path which is in parallel with the path formed by the switching elements 16-3 and 16-4 and leads to the same target, i.e. to the terminal 14*a* or to the terminal 18*a* depending on the direction. The switching elements 16-5 and 16-4 form a path which leads to the same target as the path formed by the switching elements 16-7 and 16-2, namely to the terminal 14*b* or to the terminal 18*a* depending on the direction. The switching elements 16-1 and 16-8 form a path which leads to the same target as the path formed by the switching elements 16-3 and 16-6. Furthermore, the switching elements 16-7 and 16-8 form a path which is in parallel with the path formed by the switching elements 16-5 and 16-6 and leads to the same target, namely to the terminal 14*b* or 18*b* depending on the direction.

In the event of an elimination, an arbitrary switching element can now be removed. However, a second switching element to be eliminated should be chosen such that a connection can still be produced from each terminal to each other terminal via the remaining switching elements. This results in a series of reduced circuits, two of which for example are illustrated in FIGS. 1 and 2 described above and in FIGS. 5 to 14 described below. The reduced circuits substantially enable two types of modules: two-quadrant modules and four-quadrant modules.

Two-quadrant modules allow any type of interconnection of storage of two adjacent individual modules, that is to say a parallel interconnection of storage, a bypass interconnection of storage and a series interconnection of storage. However, in the case of a series interconnection of storage, two-quadrant modules enable only one polarity direction, Consequently, only positive voltages and 0 V can be generated in a module string. In two-quadrant modules, freewheeling diodes of those switches without antiparallel switches allow an uncontrollable current flow in at least one direction. As an advantage, the semiconductor demand and the ohmic losses (conduction losses) are significantly lower than in the case of four-quadrant modules. This can furthermore cause uncontrollable short circuits, if a reverse current through the load is caused (for example in the case of inductive loads), or the system (for example having a Marquardt macrotopology) acts as a converter between a plurality of terminals (for example different energy grids having direct, alternating or three-phase current) and one of said terminals is short-circuited, as a result of which the short circuit through corresponding diodes can entail a short circuit in further terminals.

Four-quadrant modules likewise allow any type of interconnection of storage like the two-quadrant modules. However, four-quadrant modules allow both polarities in the case of series interconnections of storage. Consequently, it is possible to reverse the polarity of individual modules with respect to a neighboring individual module. Furthermore, four-quadrant modules have the advantage that they are short-circuit-proof, particularly if the load of a string or else of a phase module is short-circuited, since each current path allows a control of the current flow in both directions in principle by virtue of antiparallel switches.

Figure 5:
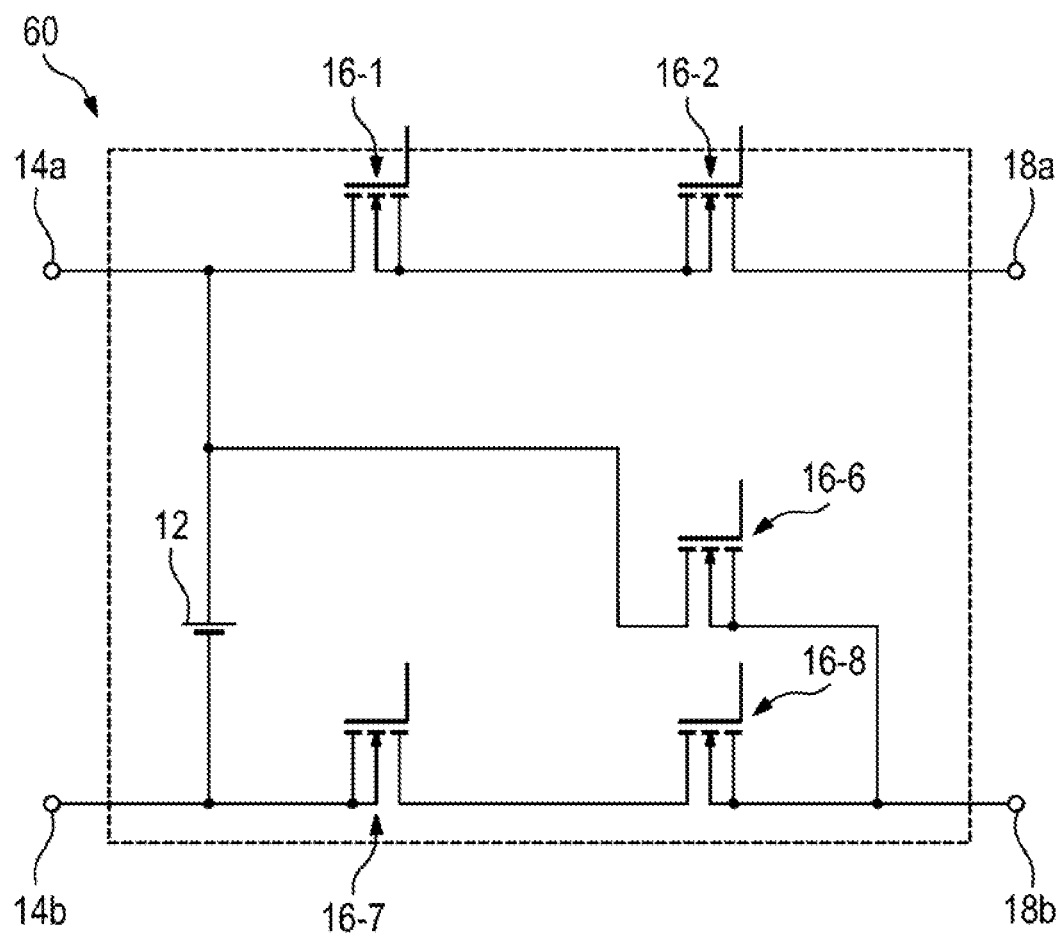
FIGS. 5, 6 and 7 show further exemplary embodiments of an individual module according to aspects of the invention which represents a two-quadrant module.

FIG. 5 shows a module 60 having substantially a construction of the module 10 from FIG. 1. The switching element 16-3 has merely been replaced by the switching element 16-6, but the latter lies on the same current path. The module 60 thus also has a two-quadrant topology and enables the same functions as the module 10 from FIG. 1.

Figure 6:
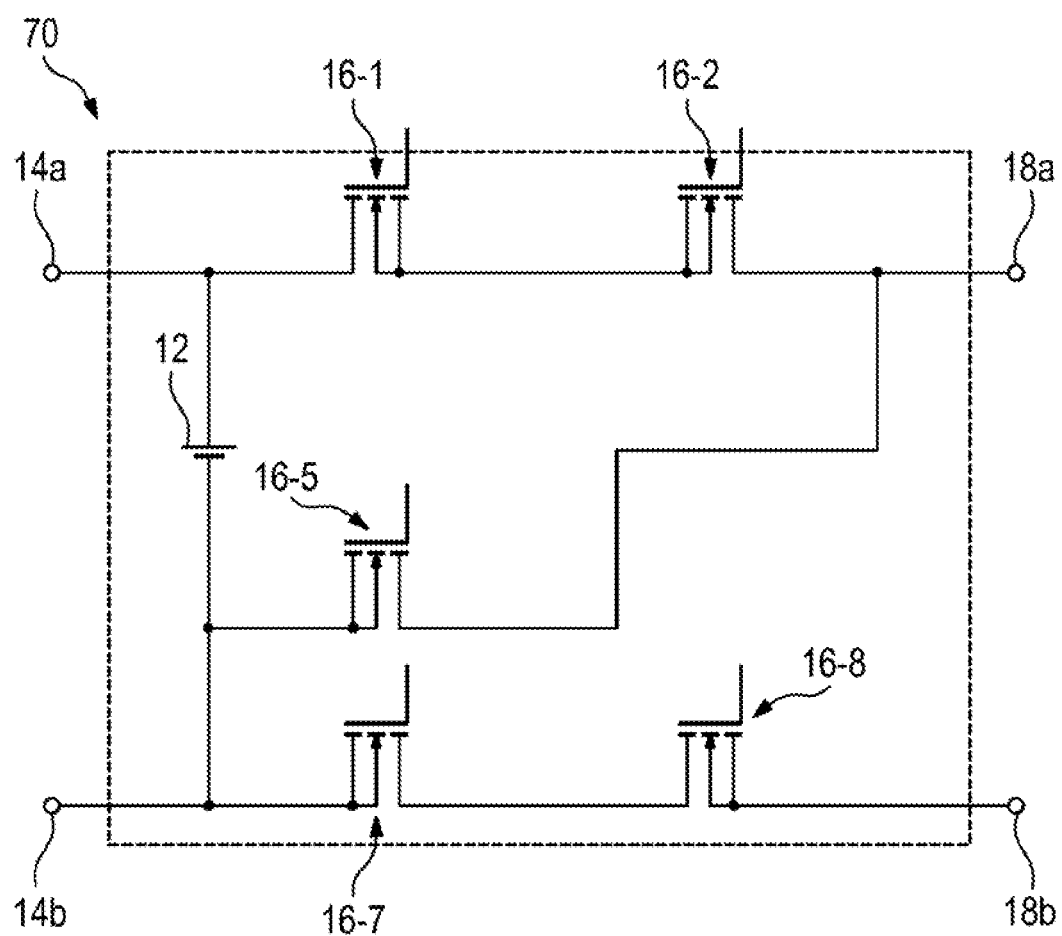
Figure 7:
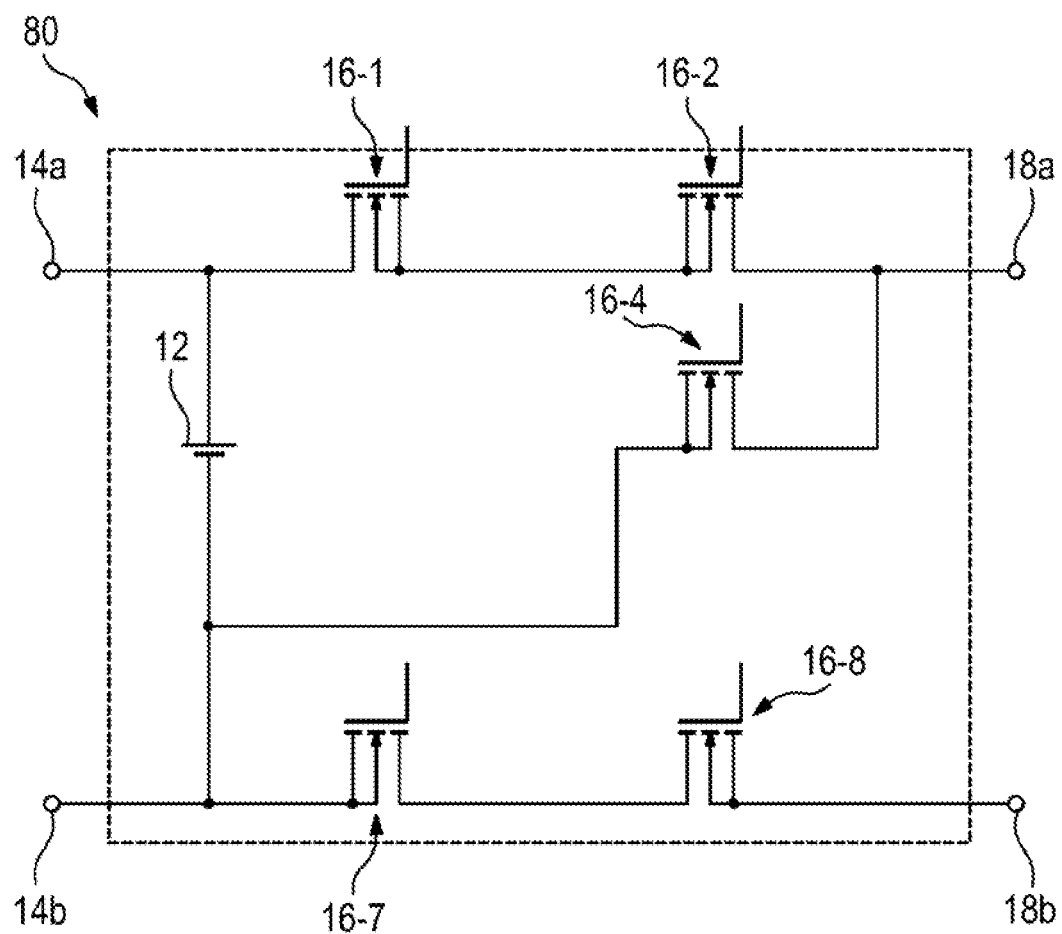

FIGS. 6 and 7 show further individual modules according to aspects of the invention. The module 70 comprises the five switching elements 16-1, 16-2, 16-5, 16-7 and 16-8. The module 80 comprises the five switching elements 16-1, 16-2, 16-4, 16-7 and 16-8. In comparison with the modules 10 (FIG. 1) and 60 (FIG. 5), an opposite polarity is made possible in the case of a series interconnection of the energy storage. For the rest, the construction of the modules 70 and 80 is identical to the embodiments already described.

In FIGS. 6 and 7, the parallel interconnection and the bypass interconnection correspond to the switching states of the modules 10 and 60. In FIG. 6, a series interconnection of the energy storage 12 can be achieved by closing the switching element 16-5 when the switching elements 16-1, 16-2 and 16-7, 16-8 are open. in FIG. 7, said series interconnection is achieved by correspondingly closing the switching element 16-4.

Figure 8:
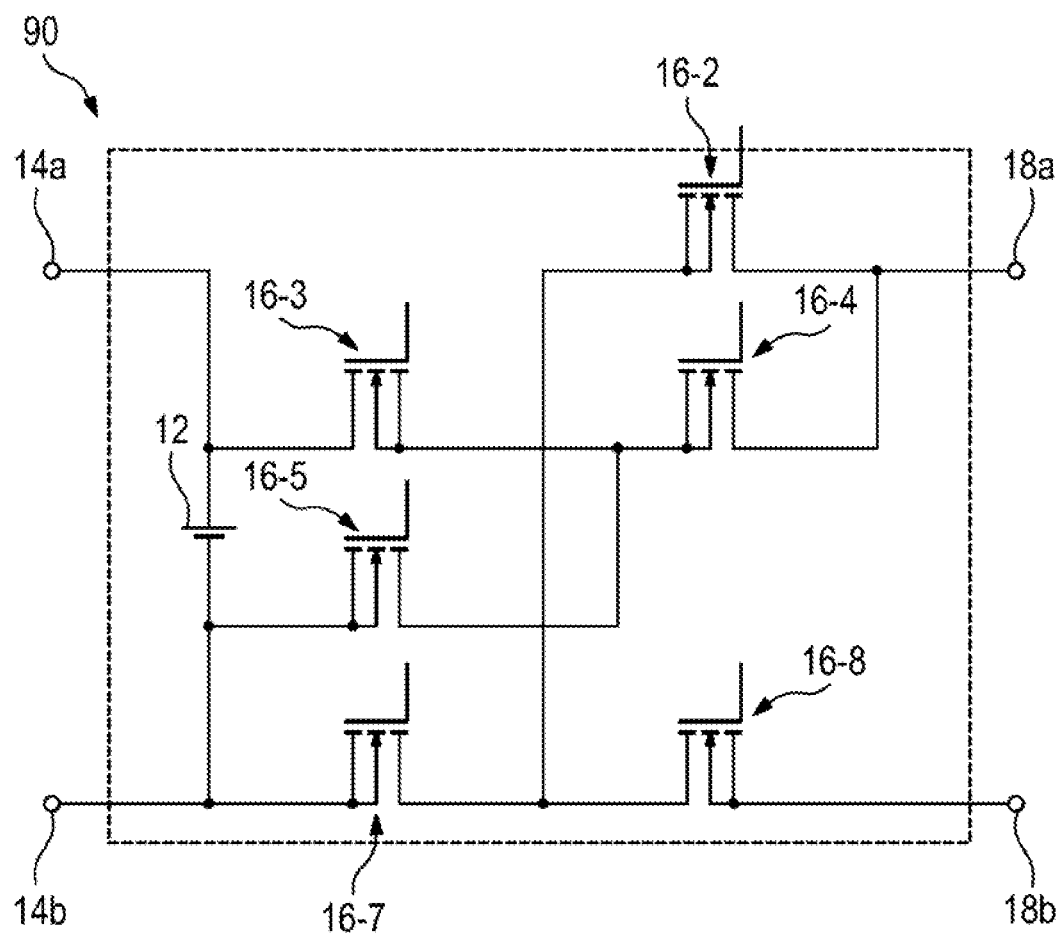
FIGS. 8, 9, 10, and 11 show further exemplary embodiments of an individual module according to aspects of the invention which represents a two-quadrant module having redundant load paths.

FIG. 8 shows a further two-quadrant module 90 according to aspects of the invention. The module 90 comprises six switching elements 16-2 to 16-5 and 16-7, 16-8. This individual module 90 can also enable all types of interconnection of adjacent energy storage. For a parallel interconnection of the adjacent energy storage, for example, the switching elements 16-3, 16-4 and 16-7, 16-8 are closed. The switching elements 16-2 and 16-5 are open for a parallel interconnection. For a series interconnection of the adjacent energy storage 12, for example, the switching elements 16-4, 16-5 are closed. The switching elements 16-2, 16-3, 16-7, 16-8 are open. A further series interconnection could be achieved by closing the switching elements 16-2, 16-7 when the switching elements 16-3 to 16-5 and 16-8 are open. A third possibility for a series interconnection is afforded by a combination of the two alternatives mentioned above, that is to say closing the switching elements 16-2, 16-7 and 16-4, 16-5 when the switching elements 16-3, 16-8 are open. For a bypass interconnection it is merely necessary to enable a path from one side of the module 90 to the other side of the module 90, such that a plurality of switching states are possible for this interconnection. By way of example, the switching elements 16-3 and 16-4 could be closed while the remaining switching elements 16-2, 16-5, 16-7, 16-8 are open. However, the switching elements 16-7 and 16-8 could also be closed while the remaining switching elements 16-2 to 16-5 are open.

Figure 9:
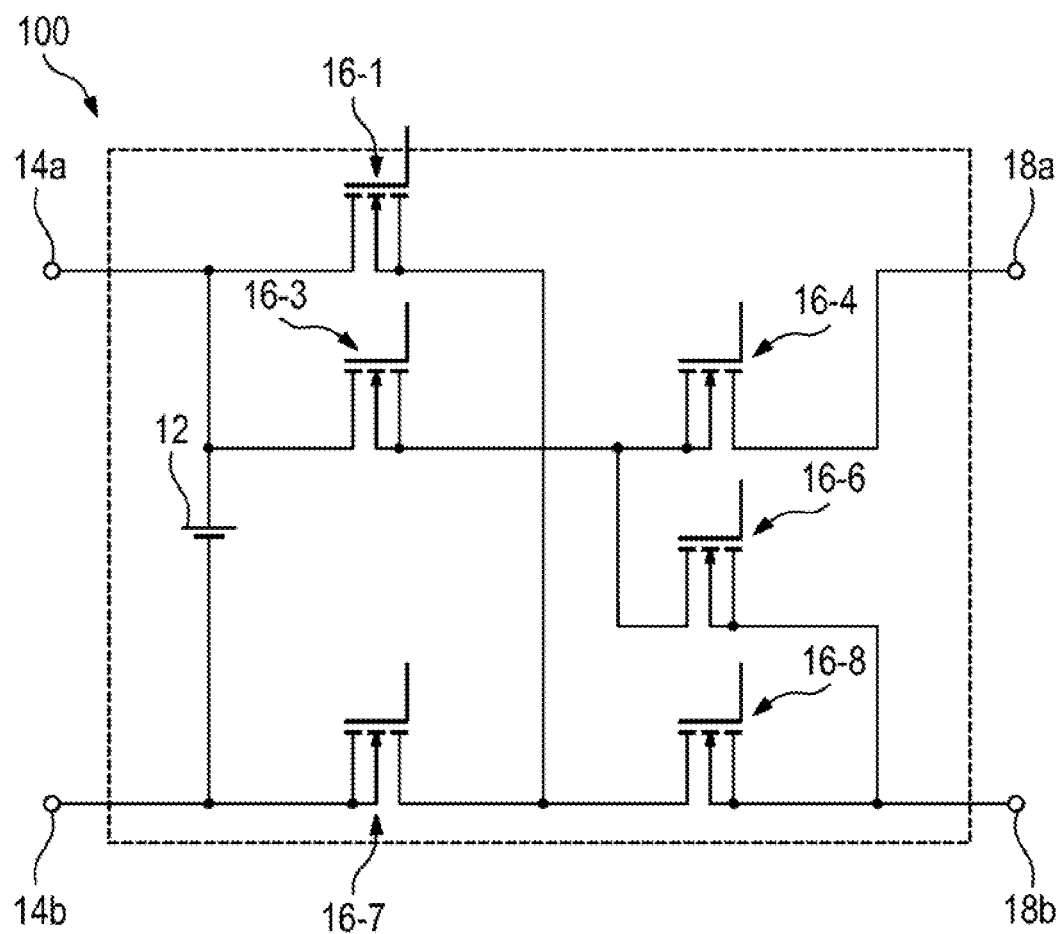
Figure 10:
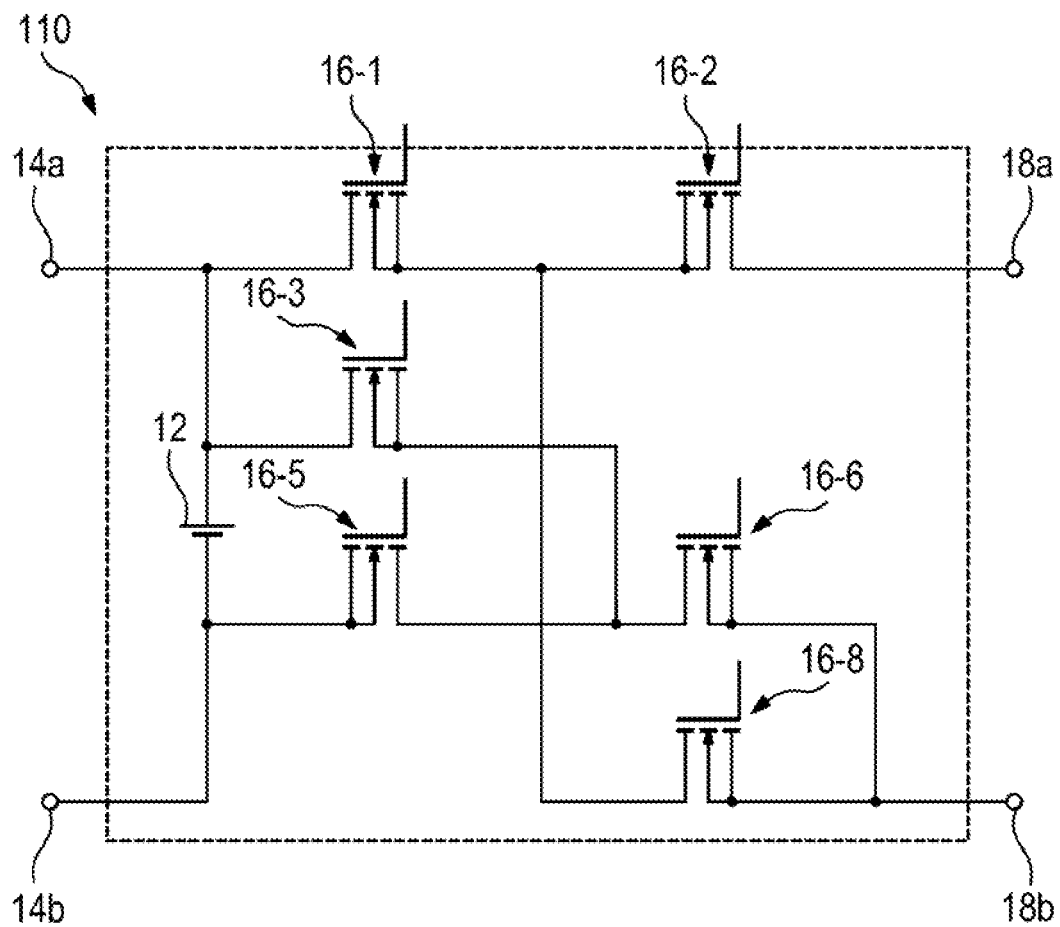
Figure 11:
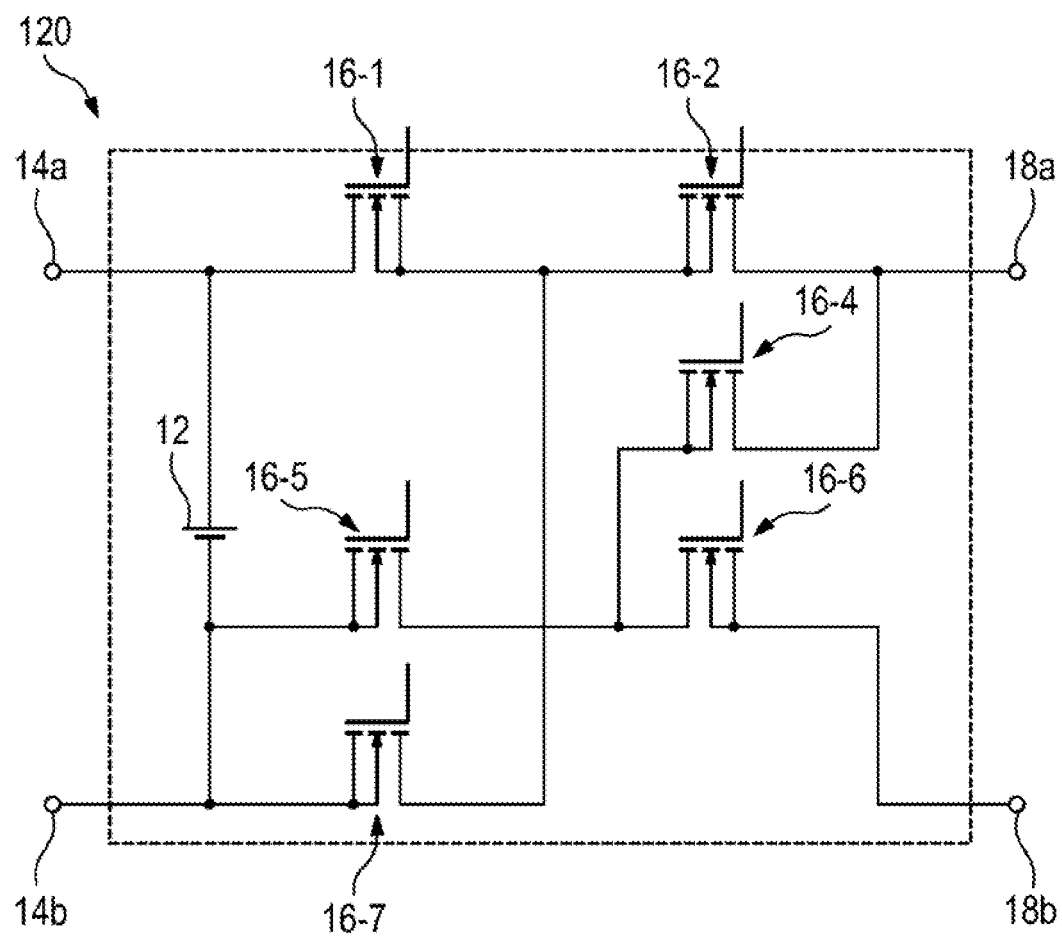
Figure 12:
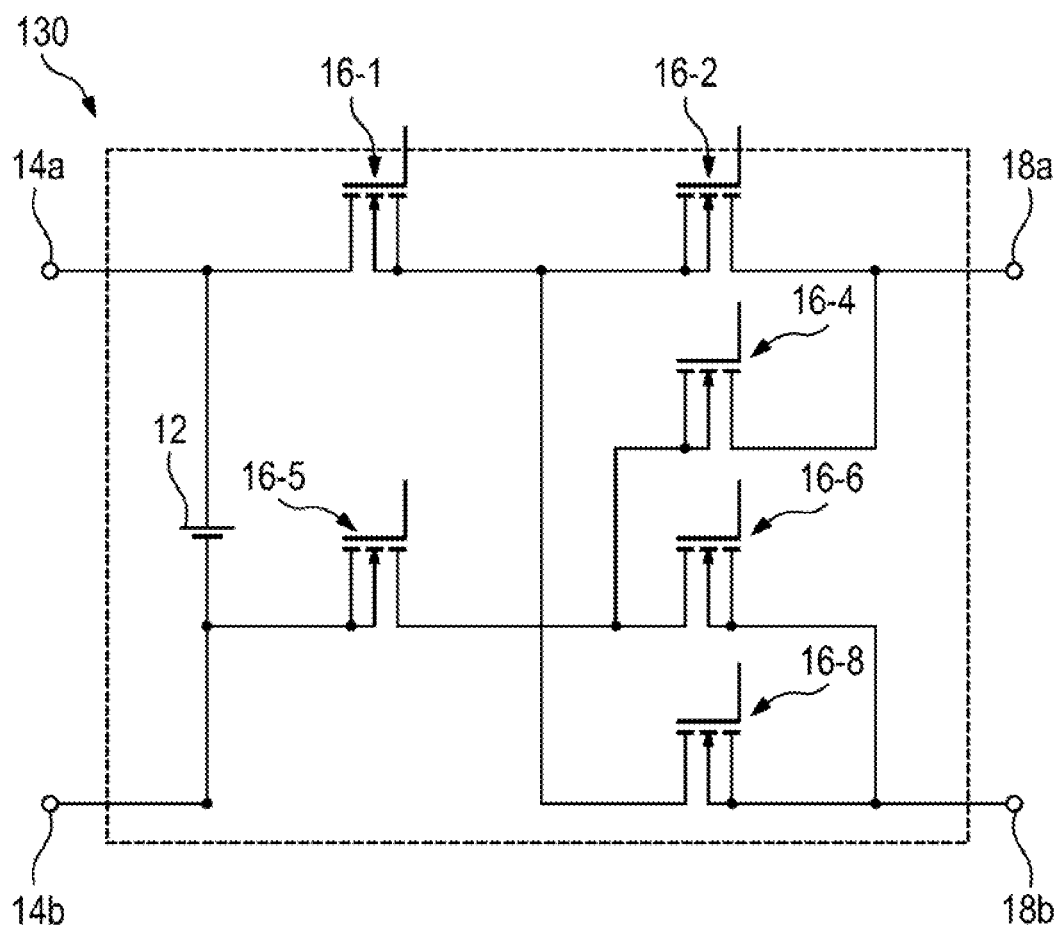
FIGS. 12, 13 and 14 show further exemplary embodiments of an individual module according to aspects of the invention which represents a four-quadrant module.

FIGS. 9 to 11 show even further two-quadrant modules 100, 110, 120 comprising six switching elements of varying arrangement, which enable the envisaged interconnections of the energy storage 12 by way of corresponding switching states of the respective switching elements.

In FIG. 9, a series interconnection could be realized by closing the switching elements 16-1, 16-8 and/or the switching elements 16-3, 16-6 when the remaining corresponding switching elements are open. A parallel interconnection could be realized for example by closing the switching elements 16-3, 16-4, 16-7, 16-8 while the switching elements 16-1, 16-6 are open. A bypass interconnection could be realized for example by closing the switching elements 16-3, 16-4 or 16-7, 16-8 while the remaining corresponding switching elements are open.

In FIG. 10, a series interconnection could be realized by closing the switching elements 16-1, 16-8 and/or the switching elements 16-3, 16-6 when the remaining corresponding switching elements are open. A parallel interconnection could be realized for example by closing the switching elements 16-1, 16-2, 16-5, 16-6 while the switching elements 16-3, 16-8 are open. A bypass interconnection could be realized for example by closing the switching elements 16-1, 16-2 or 16-5, 16-6 while the remaining corresponding switching elements are open.

In FIG. 11, a series interconnection could be realized by closing the switching elements 16-4, 16-5 and/or the switching elements 16-2, 16-7 when the remaining corresponding switching elements are open. A parallel interconnection could be realized for example by closing the switching elements 16-1, 16-2, 16-5, 16-6 while the switching elements 16-4, 16-7 are open. A bypass interconnection could be realized for example by closing the switching elements 16-1, 16-2 or 16-5, 16-6 while the remaining corresponding switching elements are open.

In addition to the four-quadrant module 20 in FIG. 2, FIGS. 12 to 14 show further four-quadrant modules 130, 140, 150 comprising six switching elements. For a parallel interconnection of adjacent storage elements, in FIG. 12, for example, the switching elements 16-1, 16-2 and 16-5, 16-6 could be closed and the switching elements 16-4 and 16-8 could be opened. For a first series interconnection, for example, the switching elements 16-4, 16-5 are dosed and the switching elements 16-1, 16-2, 16-6, 16-8 are open. A further second series interconnection is achieved if the switching elements 16-1, 16-8-are closed and the switching elements 16-2, 16-4 to 16-6 are open, said second series interconnection having an opposite polarity with respect to the first series interconnection mentioned above. For a bypass interconnection, for example, the switching elements 16-1, 16-2 could be closed and the switching elements 16-4 bis 16-6 and 16-8 could be kept open, or only the switching elements 16-5, 16-6 could be closed and the switching elements 16-1, 16-2, 16-4, 16-8 could be opened.

Figure 13:
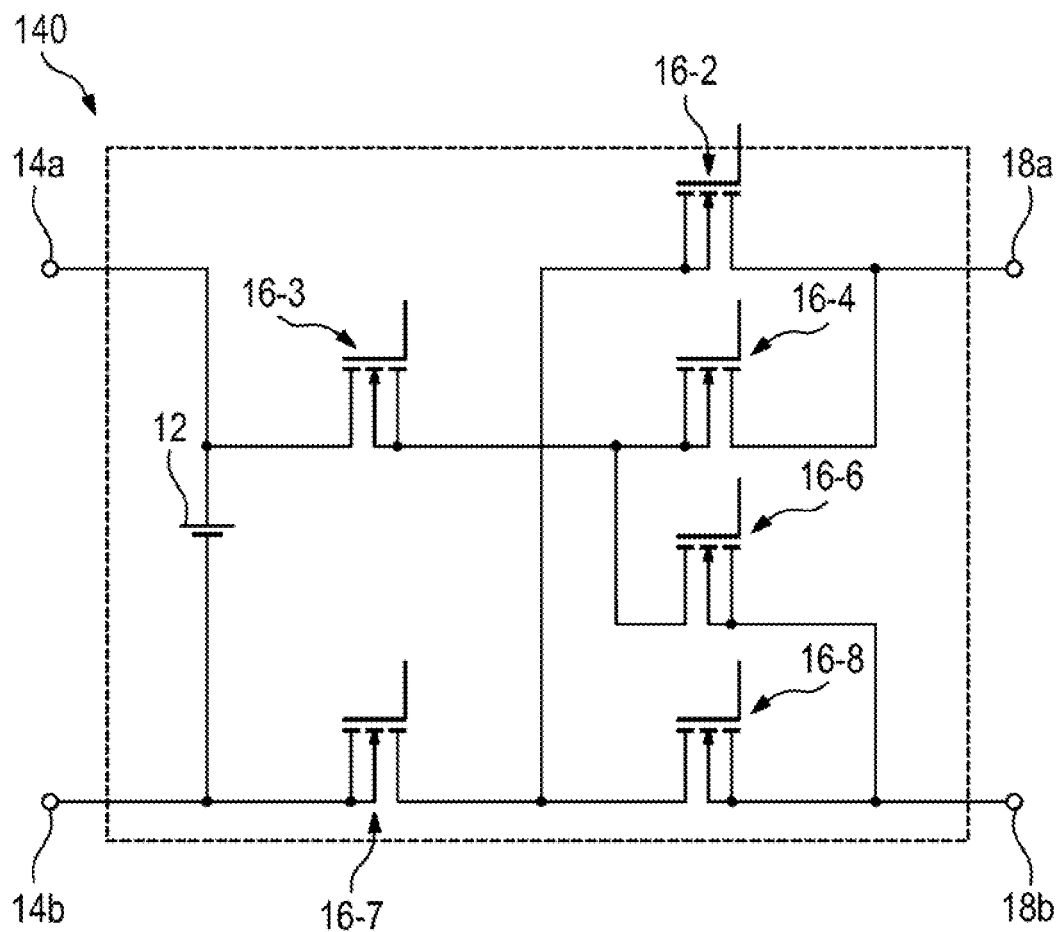

In FIG. 13, for a parallel interconnection, for example, the switching elements 16-3, 16-4 and 16-7, 16-8 could be closed and the switching elements 16-2 and 16-6 could be opened. For a first series interconnection, for example, the switching elements 16-2, 16-7 are closed and the switching elements 16-3, 16-4, 16-6, 16-8 are open. A further second series interconnection is achieved if the switching elements 16-3, 16-6 are closed and the switching elements 16-2, 16-4, 16-7, 16-8 are open, said second series interconnection having an opposite polarity with respect to the first series interconnection mentioned above. For a bypass interconnection, for example, the switching elements 16-3, 16-4 could be closed and the switching elements 16-2, 16-6 to 16-8 could be kept open, or only the switching elements 16-7, 16-8 could be closed and the switching elements 16-2, 16-3, 16-4, 16-6 could be opened.

Figure 14:
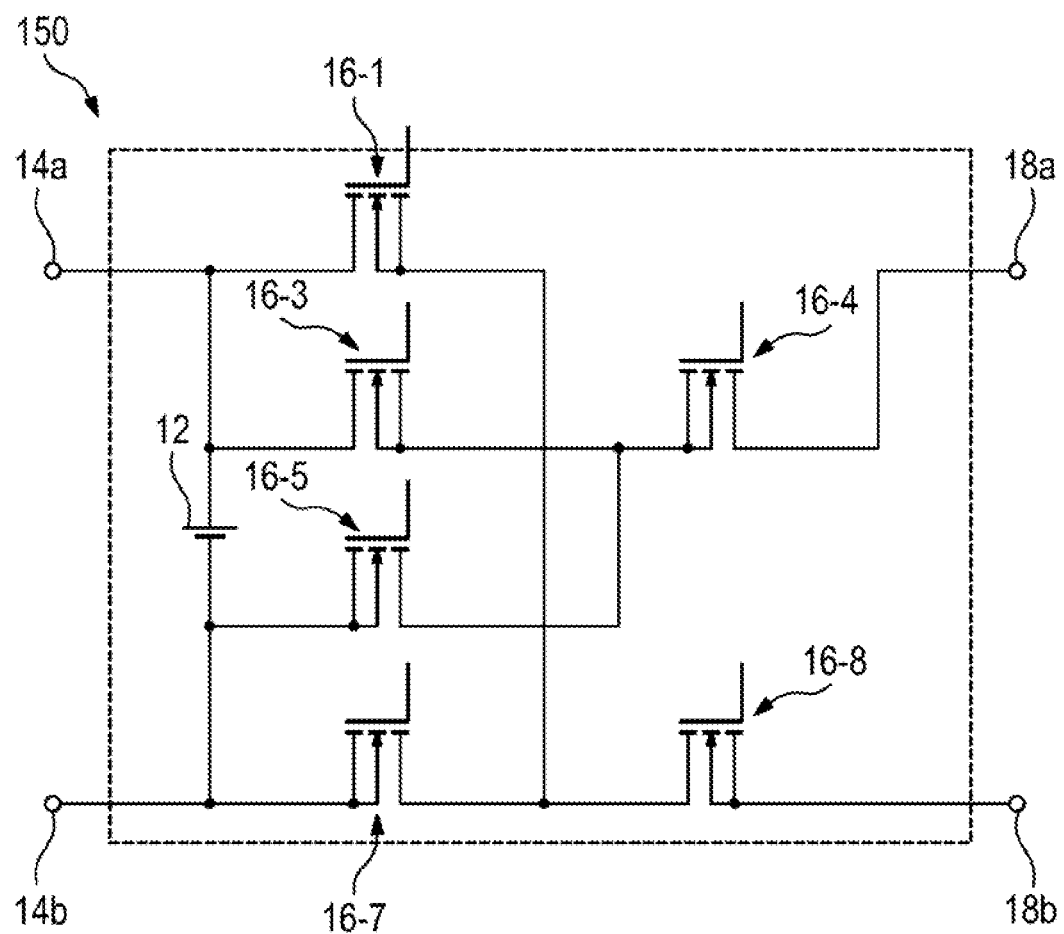

In FIG. 14, for a parallel interconnection, for example, the switching elements 16-3, 16-4 and 16-7, 16-8 could be closed and the switching elements 16-1 and 16-5 could be opened. For a first series interconnection, for example, the switching elements 16-4, 16-5 are closed and the switching elements 16-1, 16-3, 16-7, 16-8 are open. A further second series interconnection is achieved if the switching elements 16-1, 16-8 are closed and the switching elements 16-3, 16-4, 16-5, 16-7 are open, said second series interconnection having an opposite polarity with respect to the first series interconnection mentioned above. For a bypass interconnection, for example, the switching elements 16-3, 16-4 could be closed and the switching elements 16-1, 16-5, 16-7, 16-8 could he kept open, or only the switching elements 16-7, 16-8 could be closed and the switching elements 16-1, 16-3, 16-4, 16-5 could be opened.

The individual modules 10, 20, 30, 60, 70, 80, 90, 100, 110, 120, 130, 140, 150 shown can be passivated in a system comprising a plurality of individual modules 10, 20, 30, 60, 70, 80, 90, 100, 110, 120, 130, 140, 150 if none of the respective switching elements 16-1 to 16-8 is activated, that is to say that the respective switching elements 16-1 to 16-8 are all open, and the respective switching elements 16-1 to 16-8 have an antiparallel diode. If all the switching elements are open, a current can flow into the individual modules 10, 20, 30, 60, 70, 80, 90, 100, 110, 120, 130, 140, 150, wherein the individual modules 10, 20, 30, 60, 70, 80, 90, 100, 110, 120, 130, 140, 150 themselves balance one another. Thus, if a voltage whose absolute value is greater than the sum of the voltage that can be provided by the energy storage 12 is present at a system of individual modules, the energy storage 12 are charged, the polarity of the voltage present at the system being insignificant for the charge of the energy storage 12.

If more switching elements than shown in FIGS. 1, 2 and 5 to 14 are removed, some switching states are omitted, such as a series connection, for example, which may have advantages for specific applications.

FIG. 4 shows one exemplary interconnection of a plurality of individual modules 30. A series connection of a plurality of individual modules 30 forms a string, such that a plurality of side strings can be formed. In this case, different side strings can also he interconnected in parallel with one another. By means of a corresponding choice of the energy storage 12, it is possible to realize power converter systems such as, for example, an electrical converter system 40 according to aspects of the invention with the use of at least one capacitor as energy storage 12, or an interconnectable battery system 50 according to aspects of the invention with the use of partial batteries or battery cells as energy storage 12.

In other words, for the interconnectable battery system 50, a plurality of individual modules 30 according to aspects of the invention are interconnected with one another. In this case, the individual modules 30 have the function of a partial battery. Providing a plurality of partial batteries 30 which are interconnected with one another and are dynamic in the interconnection makes it possible to dynamically reconfigure a hitherto hardwired battery in its interconnection. The at least one energy storage 12 of a partial battery 30 can be connected either in parallel and/or in series with at least one energy storage 12 of a neighboring partial battery, as a result of which the battery 50 can be dynamically reconfigured during operation. Consequently, the battery 50 can directly provide DC voltage, AC voltage or other forms of voltage. Furthermore, batteries 50 and/or individual modules or partial batteries 30 can also be bridged, e.g. for the case where they are defective. In particular, the energy storage 12 of the at least two mutually interconnected partial batteries 30 according to aspects of the invention can be switched between a parallel connection of the energy storage 12 of the at least two partial batteries 30, a series connection of the at least two partial batteries 30, a bridging and a switching-off of individual energy storage of the at least two partial batteries 30.

The dynamic reconfiguration of the interconnection of the partial batteries 30 makes it possible to combine the following functions, inter alia, namely charge exchange between the partial batteries 30 in order to be able to carry out conventional battery management, for example, bridging of defective partial batteries without losing the total function of the battery and generating arbitrary output voltages and temporal current and/or voltage profiles directly by means of the battery, without the need for an additional power electronic converter.

The invention claimed is:

1. A module for interconnection with at least one second module of the same type for providing an electrical converter system or a battery system, wherein the module comprises:
    at least one energy storage,
    at least five internal switching elements;
    at least two terminals respectively on a first and a second side of the module, and
    a first line extends between a first terminal on the first side and a first terminal on the second side, a second line extends between a second terminal on the first side and a second terminal on the second side, a third line extends between the first line and the second line, wherein the at least one energy store is disposed on the third line, and a fourth line extends from the third line to either the first line or the second line, wherein one of the internal switching elements is disposed on the fourth line,
    wherein the at least one energy storage is directly connected to at least one of the at least two terminals of the first side and the at least five internal switching elements are arranged and interconnectable such that, independently of a switching state of corresponding internal switching elements of the second module of the same type, all switching states are available for dynamically switching an electrical connection between the at least one energy storage and a corresponding at least one energy storage of the second module.

2. The module as claimed in claim 1, wherein the internal switching elements are low-voltage semiconductor switching elements.

3. The module as claimed in claim 1, wherein a switching element is connected directly at least one of upstream or downstream of the at least one energy storage.

4. The module as claimed in claim 1, wherein the at least five internal switching elements comprises at least eight internal switching elements, such that at least one second current path is present with respect to all minimally required current paths for dynamically switching an electrical connection between the at least one energy storage and the corresponding at least one energy storage of the second module.

5. An electrical converter system for power supplies comprising at least two interconnected modules of the same type as claimed in claim 1, wherein the at least one energy storage of each module is a capacitor.

6. A battery system for power supply comprising at least two interconnected modules of the same type as claimed in claim 1, wherein the at least one energy storage of each module is a battery.

7. The module as claimed in claim 1, wherein the fourth line extends from the third line to the first line.

8. The module as claimed in claim 1, wherein the fourth line extends from the third line to the second line.

9. The module as claimed in claim 1, wherein each switching element is a MOSFET semiconductor.

10. The module as claimed in claim 1, wherein one of the internal switching elements is disposed on the first line, and one of the internal switching elements is disposed on the second line.

11. The module as claimed in claim 1, wherein two of the internal switching elements are disposed on the first line, and two of the internal switching elements are disposed on the second line.

12. The module as claimed in claim 1, wherein none of the internal switching elements are disposed on the third line.

13. The module as claimed in claim 1, wherein the third line is directly connected to the first line and the second line, and the fourth line is directly connected to the third line and either the first line or the second line.

14. The module as claimed in claim 1, further comprising a fifth line that is connected between the third line and the fourth line, wherein one of the switching elements is disposed on the fifth line.

15. The module as claimed in claim 1, further comprising a plurality of fourth lines, wherein one of the fourth lines extends from the third line to the first line, and another of the fourth lines extends from the third line to the second line.

16. The module as claimed in claim 15, wherein the plurality of fourth lines are interconnected by a fifth line.

* * * * *